(12) United States Patent
Portolani et al.

(10) Patent No.: US 7,061,875 B1
(45) Date of Patent: Jun. 13, 2006

(54) SPANNING TREE LOOP GUARD

(75) Inventors: Maurizio Portolani, Milpitas, CA (US); Shyamasundar S. Kaluve, Santa Clara, CA (US); Marco E. Foschiano, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1015 days.

(21) Appl. No.: 10/020,667

(22) Filed: Dec. 7, 2001

(51) Int. Cl.
*H04L 12/56* (2006.01)
*H04L 12/28* (2006.01)
*H04J 3/24* (2006.01)
*G06F 15/16* (2006.01)

(52) U.S. Cl. .................. 370/256; 370/402; 370/408; 709/238

(58) Field of Classification Search ................ 370/256; 709/238
See application file for complete search history.

(56) References Cited

U.S. PATENT DOCUMENTS

| 5,790,808 | A | 8/1998 | Seaman |
| 5,959,968 | A | 9/1999 | Chin et al. |
| 6,032,194 | A | 2/2000 | Gai et al. |
| 6,188,694 | B1 * | 2/2001 | Fine et al. .................. 370/402 |
| 6,202,114 | B1 | 3/2001 | Dutt et al. |
| 6,219,739 | B1 * | 4/2001 | Dutt et al. .................. 710/311 |
| 6,304,575 | B1 | 10/2001 | Carroll et al. |
| 6,628,624 | B1 | 9/2003 | Mahajan et al. |
| 6,697,339 | B1 * | 2/2004 | Jain ......................... 370/256 |
| 6,765,877 | B1 * | 7/2004 | Foschiano et al. .......... 370/250 |
| 6,801,506 | B1 | 10/2004 | Dey |
| 6,813,250 | B1 | 11/2004 | Fine et al. |
| 6,831,898 | B1 | 12/2004 | Edsall et al. |
| 6,882,630 | B1 * | 4/2005 | Seaman ..................... 370/256 |
| 6,891,808 | B1 * | 5/2005 | Ishii ......................... 370/256 |
| 6,898,189 | B1 | 5/2005 | Di Benedetto et al. |
| 6,934,263 | B1 * | 8/2005 | Seaman ..................... 370/256 |
| 2001/0025318 | A1 * | 9/2001 | Higashiyama .............. 709/238 |
| 2003/0016624 | A1 * | 1/2003 | Bare ......................... 370/217 |

OTHER PUBLICATIONS

Radia Perlman, "Interconnetions Second Edition: Bridges, Routers, Switches, and Internetworking Protocols" pp. 54-75, Addison Wesley Longman, Inc., 2000.

* cited by examiner

*Primary Examiner*—Hassan Kizou
*Assistant Examiner*—Hong Sol Cho
(74) *Attorney, Agent, or Firm*—Cesari and McKenna, LLP (57) ABSTRACT

A system and method prevents the formation of loops that are not detected by the Spanning Tree Protocol (STP). An intermediate network device preferably includes a plurality of ports for receiving and forwarding network messages and a STP engine in communicating relationship with the ports. The STP engine transitions the ports among a plurality of spanning tree port states, including a discarding state, a learning state and a forwarding state. The device further includes a loop guard engine that is in communicating relationship with the STP engine and the ports. The loop guard engine monitors the receipt of configuration bridge protocol data unit (BPDU) messages by the ports. If a given port stops receiving BPDU messages, the loop guard engine prevents the STP engine from transitioning the given port to the forwarding state. Instead, the loop guard engine preferably causes the port to transition to a new state in which networks messages are explicitly blocked from being forwarded or received. If the given port subsequently receives a BPDU message, the loop guard engine releases the port from the new state, thereby allowing it to transition to some other spanning tree port state.

15 Claims, 6 Drawing Sheets

| EVENT TABLE ||
|---|---|
| EVENT | DESCRIPTION |
| E1 | PORT HAVING LOOP GUARD ENABLED STOPS RECEIVING BPDU MESSAGES |
| E2 | PORT RECEIVES A BPDU MESSAGE |
| E3 | FORWARD DELAY TIMER EXPIRES FOR A DESIGNATED PORT OR THE ROOT PORT WHILE IN THE DISCARDING STATE |
| E4 | FORWARD DELAY TIME EXPIRES FOR PORT IN LEARNING STATE WITHOUT THE RECEIPT OF "BETTER" BPDU INFORMATION |
| E5 | PORT IN LEARNING OR FORWARDING STATE RECEIVES "BETTER" BPDU INFORMATION |
| E6 | BLOCKED PORT BECOMES A DESIGNATED PORT OR THE ROOT PORT, AND CAN RAPIDLY TRANSITION TO FORWARDING |

FIG. 5

SPANNING TREE LOOP GUARD

BACKGROUND OF THE INVENTION

1. Field of the Invention

The present invention relates generally to computer networks, and more specifically, to a method and apparatus for preventing the formation of loops.

2. Background Information

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point is links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the device to the LANs or end stations. The switching function includes receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames so large that the network becomes overwhelmed.

Spanning Tree Protocol

To avoid the formation of loops, most bridges and switches execute a spanning tree protocol or algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the 802.1D spanning tree protocol, bridges elect a single bridge within the bridged network to be the "root" bridge. The 802.1D standard takes advantage of the fact that each bridge has a unique numerical identifier (bridge ID) by specifying that the root is the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. More specifically, upon start-up, each bridge initially assumes that it is the root and transmits BPDU messages accordingly. Upon receipt of a BPDU message from a neighboring device, its contents are examined and compared with similar information (e.g., assumed root and lowest root path cost) stored by the receiving bridge. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to changes and failures, the root periodically (e.g., every hello time) transmits BPDU messages. The default hello time is two seconds. In response to receiving BPDUs on their root ports, bridges transmit their own BPDUs from their designated ports, if any. Thus, every two seconds BPDUs are propagated throughout the bridged network, confirming the active topology. If a bridge stops receiving BPDU messages on a given port (indicating a possible link or device failure), it will continue to increment a respective message age value until it reaches a maximum age (max age) threshold. The bridge will then age out, i.e., discard, the stored BPDU information and proceed to re-calculate the root, root path cost and root port by transmitting BPDU messages utilizing the next best information it has. The maximum age value used within the bridged network is typically set by the root, which enters the appropriate value in its BPDU messages. Normally, each bridge replaces its stored BPDU information every hello time, thereby preventing it from being discarded and maintaining the current active topology.

When BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, the 802.1D standard calls for ports to transition through two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the bridge's filtering database. At the end of a second preset time, the port transitions from the learning state to the forwarding state, thereby allowing frames to be forwarded to and from the port. The time spent in each of the listening and the learning states is referred to as the forwarding delay.

Although the spanning tree protocol provided in the 802.1D standard is able to maintain a loop-free topology despite network changes and failures, re-calculation of the active topology can be a time consuming and processor intensive task. For example, re-calculation of the spanning tree following an intermediate device crash or failure can take approximately thirty seconds. During this time, message delivery is often delayed as ports transition between states. Such delays can have serious consequences on time-sensitive traffic flows, such as voice or video traffic streams.

Rapid Spanning Tree Protocol

Recently, the IEEE promulgated a new standard (the 802.1w standard) that defines a rapid spanning tree protocol (RSTP) to be executed by otherwise 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1w standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a discarding or blocking state. A port assigned the Root Port Role can be rapidly transitioned to the forwarding state provided that all of the ports assigned the Alternate Port Role are placed in the discarding or blocking state. Similarly, if a failure occurs on the port currently assigned the Root Port Role, a port assigned the Alternate Port Role can be reassigned to the Root Port Role and rapidly transitioned to the forwarding state, provided that the previous root port has been transitioned to the discarding or blocking state. A port assigned the Designated Port Role or a Backup Port Role that is to be reassigned to the Designated Port Role can be rapidly transitioned to the forwarding state, provided that the roles of the ports of the downstream bridge are consistent with this port being transitioned to forwarding. The RSTP provides an explicit handshake to be used by neighboring bridges to confirm that a new designated port can rapidly transition to the forwarding state.

Like the STP described in the 802.1D specification standard, bridges running the RSTP also exchange BPDU messages in order to determine which roles to assign to the bridge's ports. The BPDU messages are also utilized in the handshake employed to rapidly transition designated ports to the forwarding state. RSTP also uses timers, including a received information while (rcvdInfoWhile) timer, which is similar to STP's max age timer. The rcvdInfoWhile timer is a count down (to zero) timer, while the max age timer is a count up timer.

Loops Undetectable by Spanning Tree Protocols

In some cases, a single, duplex link coupling two neighboring bridges (which are also indirectly coupled through other bridges or devices) may physically comprise two simplex, i.e., unidirectional, transmission lines, such as two fiber optic lines, operating in opposite directions. Certain failures associated with such lines can result in the formation of loops that are undetectable by the STP. For example, suppose two bridges, designated A and B, are connected by a single trunk link formed from two unidirectional transmission lines, and that the respective port at Bridge B is assigned the designated port role, while the peer port at Bridge A is assigned the alternate port role. In this case, the port at Bridge B is placed in the forwarding state and the port at bridge A is placed in the discarding state. As long as the port at Bridge A continues to receive "superior" BPDU messages from Bridge B, it will remain in the blocking state. Suppose, however, that the trunk link becomes unidirectional. That is, bridge B continues to send BPDU messages to Bridge A, but these BPDU messages are never received, and yet the trunk line is not considered to be "down". Accordingly, the BPDU information stored for the port at Bridge A eventually ages out and the STP running at Bridge A transitions the port to the forwarding state. Because Bridge B is unaware of the link failure, the port at Bridge B remains in the forwarding state. With the ports at both Bridge A and Bridge B in the forwarding state a loop is created. As described above, the creation of such a loop causes network messages to be replicated, wasting substantial network bandwidth and potentially causing a network outage.

A loop may also be created as a result of an error or failure in the operation of the STP at Bridge B, such as a software error. Specifically, the STP running at Bridge B may determine that the port of Bridge B that is coupled to Bridge A should be assigned the Designated Port Role and be transitioned to the forwarding state. Yet, the STP running at Bridge B may fail for some reason to have BPDU messages sent from the port. In this case, the STP running at Bridge A concludes that its port should now be assigned the designated port role and that it should be transitioned to the forwarding state. With the ports at both Bridge A and Bridge B in the forwarding state, a loop is created. Certain hardware failures can similarly result in the creation of loops. For example, the STP running at Bridge B may generate BPDU messages for transmission from the port coupled to Bride A, but those BPDU messages may never get sent due to a hardware problem at Bridge B.

In summary, unidirectional failures resulting in the formation of loops may occur as a result of malfunctioning or faulty network interface cards (NICs) and/or transceivers, a switch's central processing unit (CPU) being too busy with other processes to send BPDU messages for a relatively long time, a software bug in the STP running at the switch, or congestion algorithms that end up dropping BPDU messages. In addition, if a link up/down detection and/or auto-negotiation protocol is disabled, e.g., by network administrator action, unidirectional failures may go undetected, resulting in loops. Accordingly, a need exists to prevent the formation of loops that are undetectable by the STP.

SUMMARY OF THE INVENTION

Briefly, the present invention is directed to a system and method for preventing the formation of loops that are not detected by spanning tree protocols or algorithms. An intermediate network device operating in accordance with the present invention preferably includes a plurality of ports for receiving and forwarding network messages and a spanning tree protocol (STP) engine in communicating relationship with the ports. The STP engine includes a port transition state machine for transitioning the ports among a plurality of STP states, such as a discarding or blocking state, a learning state and a forwarding state. The STP engine may also include a port role selection state machine for assigning STP roles to the ports or for recognizing the association of roles to the ports, including a Root Port Role, an Alternate Port Role, a Designated Port Role and a Backup Port Role. In accordance with the present invention, the device further includes a loop guard engine that is in communicating relationship with the STP engine and the ports. The loop guard engine monitors the receipt of configuration bridge protocol data unit (BPDU) messages by the ports. If a given port stops receiving BPDU messages, the loop guard engine prevents the STP engine from allowing the given port to become a designated port, thereby preventing the given port from being transitioned to the forwarding state. Instead, the loop guard engine preferably causes the port to be transitioned to a new state, e.g., the loop inconsistent state. A port in the loop inconsistent state is precluded from forwarding or receiving network messages. If the given port subsequently receives a BPDU message, the loop guard engine releases the port from the loop inconsistent state, thereby allowing the port to be transitioned to one of the RSTP states. In the preferred embodiment, the loop guard engine operates on ports assigned to the Root and Alternate Port Roles.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
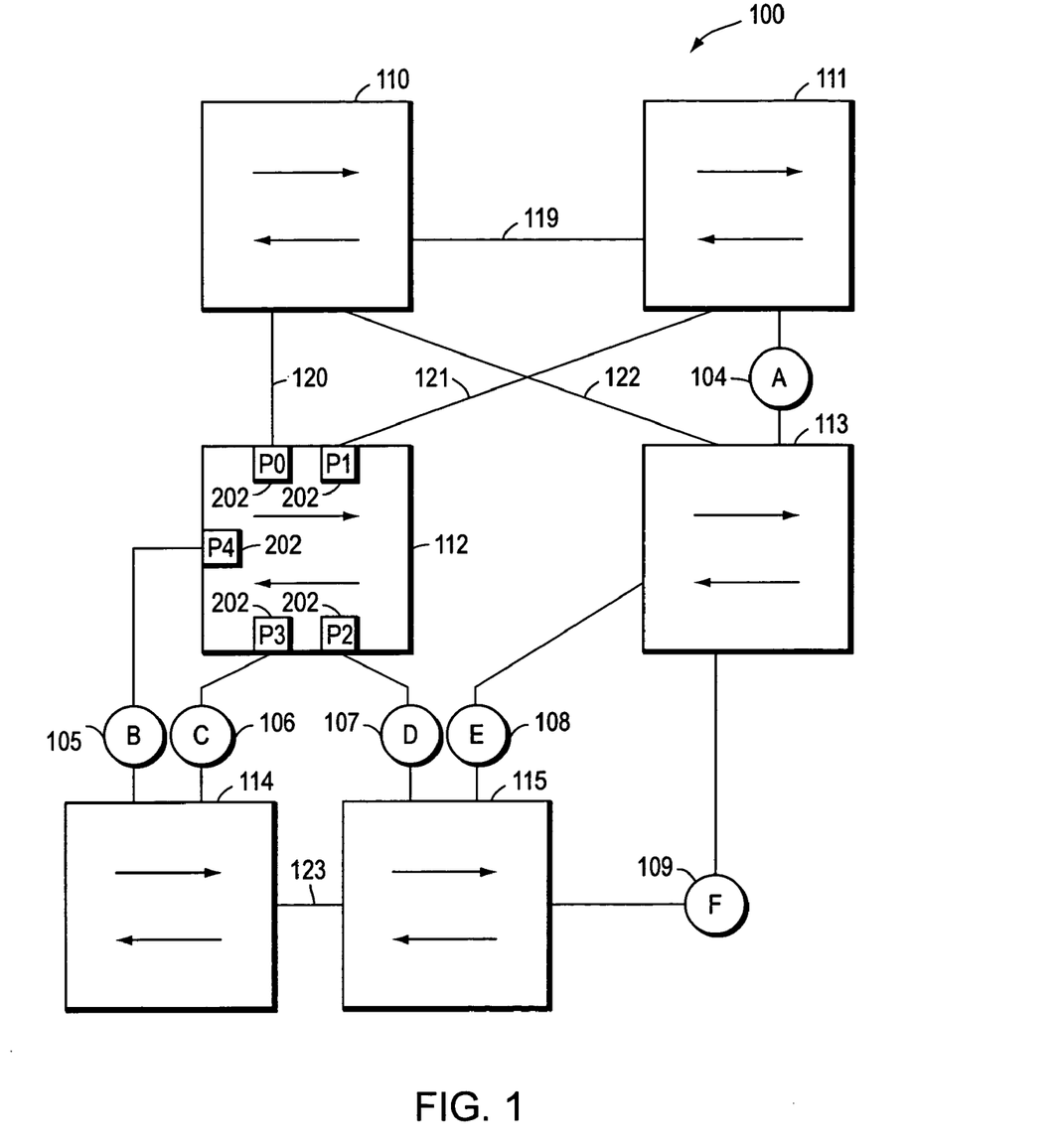
FIG. 1 is a highly schematic representation of a computer network.

FIG. 1 illustrates a partially meshed, bridged network 100 in accordance with the present invention. The network 100 preferably comprises a plurality of local area networks (LANs) 104–109 that are interconnected by a plurality of intermediate devices, such as switches 110–115. One or more entities or hosts (not shown) are preferably coupled to each LAN 104–109 so that the entities may source or sink data frames to one another over the network 100. Each switch 110–115, moreover, preferably includes a plurality of ports 202 such that each LAN 104–109 is coupled to at least one port of switches 110–115.

At least some of the switches 110–115 may be interconnected by a series of links, such as point-to-point duplex links 119–123. Links 119–123 similarly carry messages, such as data frames, between respective switches. Each switch 110–115, moreover, preferably identifies its own ports 202, e.g., by port numbers, such as zero, one, two, three, etc. Switches 110–115 are thus able to associate specific ports with the entities, LANs and/or switches coupled thereto.

It should be understood that the network 100 of FIG. 1 is meant for illustrative purposes only and that the present invention will operate with any network having redundant connections.

As shown, network 100 includes redundant paths interconnecting switches 110–115. For example, switch 112 is connected to switch 113 along at least two different paths; first, via switch 111 and second, via switch 115. The existence of such redundant paths prevents portions of the network 100 from becoming isolated should any constituent link or device fail. Such redundancy, however, also results in the creation of loops, which, as described above, are highly undesirable.

Execution of a spanning tree protocol or algorithm prevents loops by defining a loop-free network topology (i.e., an active topology). However, as set forth above, in some situations, conventional spanning tree protocols or algorithms may not detect the existence or formation of all loops. To avoid the problems created by loops that are not detected by spanning tree protocols or algorithms, among other reasons, at least some of the intermediate network devices (e.g., the switches, bridges, etc.) of network 100 utilize a "loop guard mechanism" in accordance with the present invention.

Figure 2:
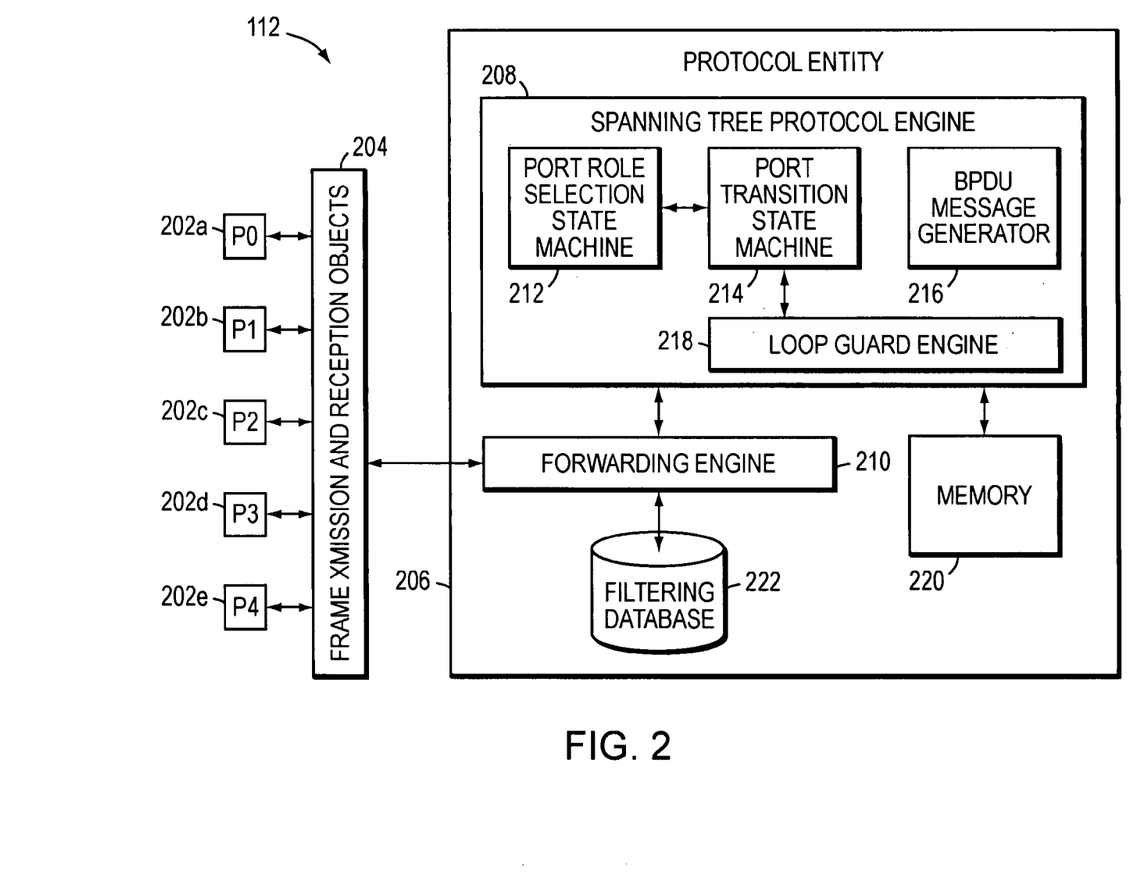
FIG. 2 is a highly schematic, partial block diagram of an intermediate network device in accordance with the present invention.

FIG. 2 is a partial block diagram of an intermediate network device in accordance with the present invention, such as switch 112. Switch 112 includes a plurality of ports 202a–202e each of which is preferably identified by a number (e.g., P0–P4). One or more frame transmission and reception objects, designated generally 204, are associated with the ports 202a–e such that network messages, including data packets and frames, received at a given port, e.g., P3, may be captured, and frames to be transmitted by switch 112 may be delivered to a given port, e.g., P1. Frame reception and transmission objects 204 are preferably message storage structures, such as queues. In the illustrated embodiment, switch 112 includes transmitting and receiving circuitry, including one or more line cards and/or network interface cards (NICs) establishing ports for the exchange of network messages, one or more or central processing units (CPUs) and/or microprocessors and associated memory devices for performing calculations and one or more bus structures.

Switch 112 further includes at least one protocol entity 206 comprising a plurality of components. In particular, the protocol entity 206 includes at least one spanning tree protocol (STP) engine 208 and at least one forwarding engine 210. The STP engine 208 preferably comprises a plurality of subcomponents, including a port role selection state machine 212, a port transition state machine 214, a bridge protocol data unit (BPDU) message generator 216 and a loop guard engine 218. Except as described herein, the STP engine 208 preferably operates substantially in compliance with a known spanning tree protocol or algorithm, such as the Spanning Tree Protocol (STP) defined in the IEEE 802.1D specification standard, the Rapid Spanning Tree Protocol (RSTP) defined in the IEEE 802.1w supplement to the 802.1D specification standard, or the Multiple Spanning Trees (MST) protocol defined in the IEEE 802.1s supplement (Draft 10, Jun. 16, 2001) to the IEEE 802.1Q specification standard, among others, all of which are hereby incorporated by reference in their entirety. The STP engine 208 includes or is in communicating relationship with a memory 220, which may be a volatile or non-volatile random access memory (RAM) or some other memory structure or device. Memory 220 is preferably organized to include a plurality of records or cells (not shown) for storing spanning tree related information or parameters, such as the switch's numeric bridge identifier (ID), the assigned path cost for each port 202a–e, the current or "best" spanning tree information for each port P0–P4, etc.

The forwarding engine 210 is in communicating relationship with the frame transmission and reception objects 204 and is coupled to at least one filtering database 222 that stores address information corresponding to at least some of the entities of network 100 (FIG. 1). Specifically, filtering database 222 has a plurality of records (not shown) each containing a plurality of cells, including a destination address cell, a destination port cell and a corresponding timer cell. Each record in the filtering database 222 preferably corresponds to a particular network entity.

The forwarding engine 210 is configured to switch or bridge network messages, such as packets and/or frames, from a source port 202 to one or more destinations ports 202 depending on information contained in the forwarding database 222 and also on the spanning tree port states of the respective ports 202 as managed by STP engine 208. The forwarding engine 212 is also in communicating relationship with the STP engine 208 and relays RSTP-related messages, such as BPDU messages, received at ports 202 thereto. STP engine 208 may also be directly coupled to the frame transmission and reception objects 204.

It will be understood by those skilled in the art that STP engine 208 and forwarding engine 210 may each comprise registers and combinational logic configured and arranged to produce sequential logic circuits. In the illustrated embodiment, engines 208 and 210 are preferably software modules or libraries containing program instructions pertaining to the methods described herein and executable by one or more processing elements (not shown) of switch 112. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available Catalyst 4000 and 6000 series of switches from Cisco Systems, Inc. of San Jose, Calif.

Execution of the STP by the switches 110–115 (FIG. 1) of the bridged network 100 results in the convergence to an active topology with one device, e.g., switch 110, being elected the root. Suppose that port P0 of switch 112 is assigned the Root Port Role and is transitioned to the forwarding state, and that port P1 is assigned the Alternate Port Role as it represents an alternate path to root 110. Port P1 is transitioned to the blocking or discarding state. The terms blocking and discarding are used interchangeably herein. In addition, suppose that ports P2–P4 of switch 112 are assigned the Designated Port Role and that each port is transitioned to the forwarding state.

Figure 3A:
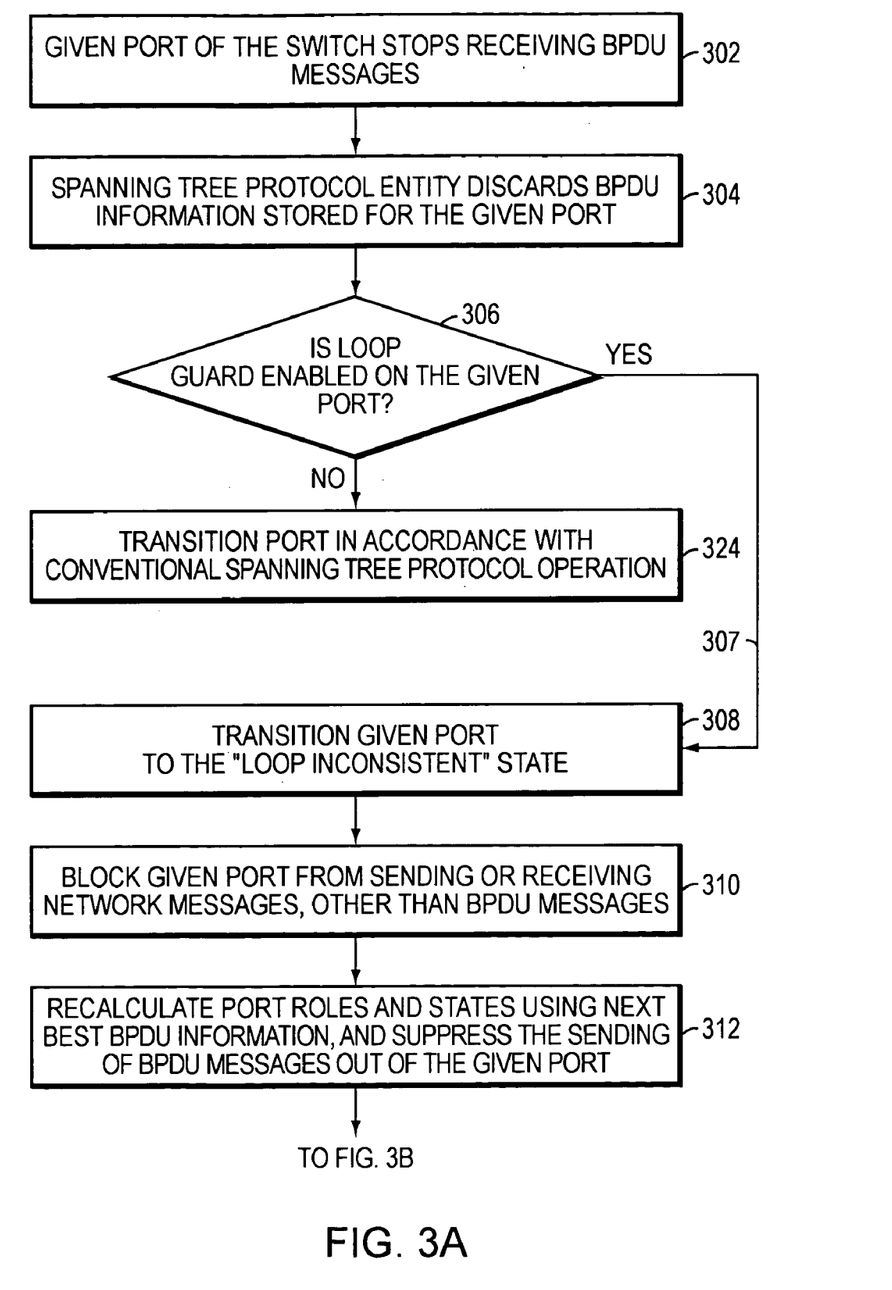
FIGS. 3A–B is a flow diagram of a preferred method of the present invention.

FIGS. 3A–B is a flow diagram of a preferred embodiment of the method of the present invention. Suppose switch 112 stops receiving BPDU messages on a given port, e.g., port P0 which is connected to switch 110 via trunk 120, as indicated at block 302 (FIG. 3A). That is, suppose trunk 120 becomes unidirectional. Switch 110 may continue to send BPDU messages on its port coupled to trunk 120, but these BPDU messages are not received by switch 112 as trunk 120 has become unidirectional. As described above, in a stable topology, a non-root bridge, such as switch 112, periodically receives BPDU messages that originate from the root on its root port as well as on its blocked ports. In response, the bridge transmits its own BPDU messages from its designated ports. If the bridge stops receiving BPDU messages on a given port, it will continue to increment the message age value until it reaches the maximum age threshold. At that point, the spanning tree protocol engine 208 discards the BPDU information stored for the respective port, as indicated at block 304.

If switch 112 were following a conventional STP or algorithm, it would then determine the spanning tree port state to which the respective port should be transitioned. In this case, switch 112 would conclude that port P0 should become a designated port, and that it should therefore be transitioned either directly or through the learning state to the forwarding state. Transitioning port P0 to the forwarding state, however, which is would occur with conventional STPs or algorithms, results in the formation of a loop in the bridged network 100. As described above, the existence of a loop may result in a proliferation of network messages, overwhelming the message transport capacity of the bridged network 100.

Utilization of the present invention prevents the formation of such a loop. More specifically, in accordance with the present invention, when the message age timer for port P0 expires and the current BPDU information is discarded, the loop guard engine 218 steps in and determines whether "loop guard" has been enabled for port P0, as indicated at decision block 306. If it is, the loop guard engine 218 prevents the port from becoming a designated port. In particular, engine 218 preferably directs the port transition state machine engine 214 to transition port P0 to a new spanning tree state, preferably called the "loop-inconsistent" state, as indicated by Yes arrow 307 and block 308. The spanning tree protocol engine 208, moreover, is preferably configured such that network messages are neither forwarded from nor received on a port that is in the loop inconsistent state, as indicated at block 310. For example, the spanning tree protocol engine 208 may instruct the forwarding engine to drop any and all network messages, e.g., data packets or frames, that are received on port P0, and to discard any network messages that would otherwise be forwarded from port P0, other than BPDU messages. The STP engine 208 also recalculates the role and spanning tree port state of each port 202, and suppresses the transmission or sending of BPDU messages from port P0, as indicated at block 312.

Figure 3B:
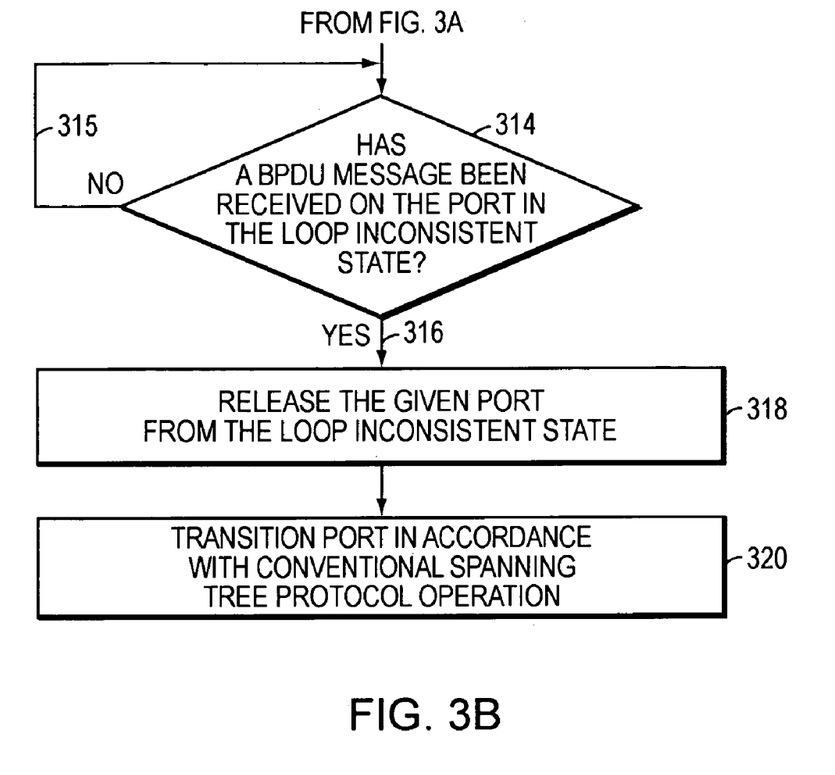

While port P0 is in the loop inconsistent state, the spanning tree protocol engine 208 preferably checks for the receipt of any BPDU messages on port P0, as indicated by decision block 314 (FIG. 3B). As indicated by No arrow 315 which loops back onto decision block 314, the spanning tree protocol engine 208 keeps checking for the receipt of any BPDU messages. If a BPDU message is received on port P0, the loop guard engine 218 preferably releases port P0 from the loop inconsistent state, as indicated by Yes arrow 316 and block 318. Once released from the loop inconsistent state, the port transition state machine 214 preferably transitions port P0 to one of the conventional spanning tree port states, e.g., discarding, listening, learning, forwarding, etc., as indicated at block 320. In a conventional manner, the particular spanning tree port state to which port P0 transitions depends on the information contained in the received BPDU message.

Referring again to decision block 306 (FIG. 3A), if loop guard is not enabled on the port which stopped receiving BPDU messages, then the port is preferably transitioned in accordance with the conventional STP or algorithm being executed at switch 112, as indicated by No arrow 322 leading to block 324. That is, the port moves to a conventional spanning tree port state.

Figure 4:
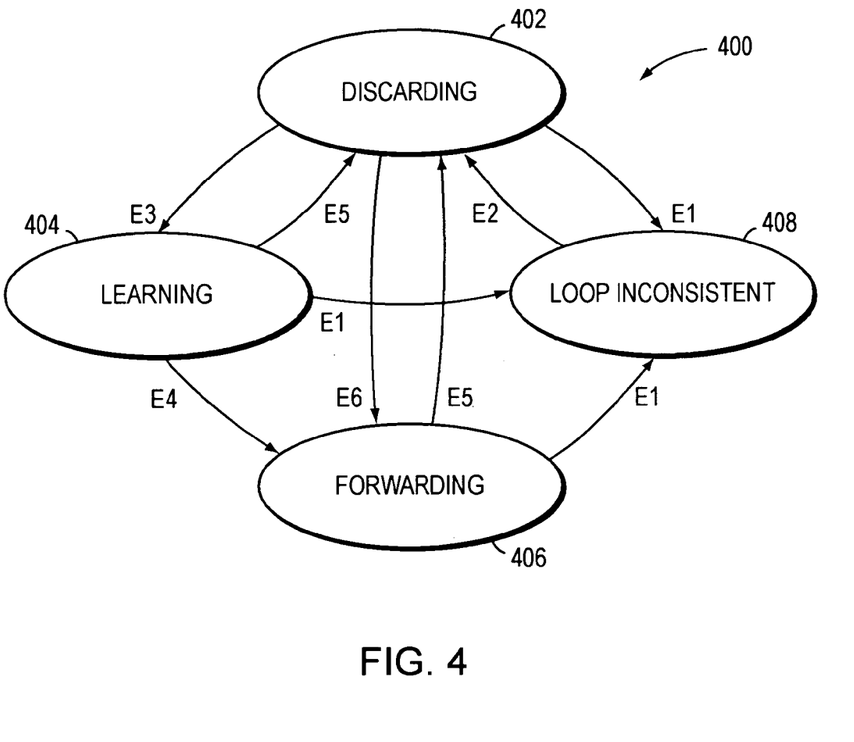
FIGS. 4 and 5 are a state diagram and an event table in accordance with the present invention.
Figure 5:
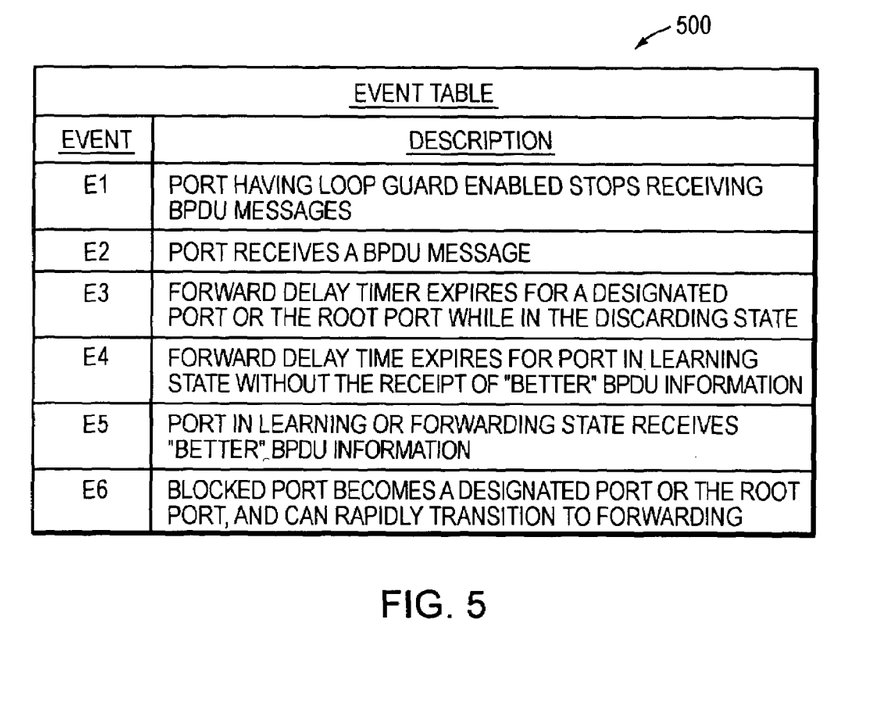

FIG. 4 is a highly schematic state diagram 400 in accordance with the present invention. The state diagram 400, which is utilized by the spanning tree port state transition machine 214, illustrates the spanning tree port states through which each port 202 may be transitioned. FIG. 5 is an event table 500 describing at least some of the events that result in a transition among the spanning tree port states shown in FIG. 4. In general, the port state transition state machine 214 preferably transitions the ports 202 of switch 112 among the following spanning tree port states: discarding or blocking 402, learning 404, forwarding 406 and loop inconsistent 408. State machine 214 may also transition ports 202 through other spanning tree port states, such as a listening state, among others.

Event E1 occurs when a port, for which loop guard is enabled, stops receiving BPDU messages. As described above and as illustrated in FIG. 4, event E1 results in the port transitioning to the loop inconsistent state 408. This may occur, moreover, from any other state 402–406. That is, an alternate port or root port, which are typically in the discarding and forwarding states 402, 406, respectively, may stop receiving BPDU messages. Furthermore, the root port may stop receiving BPDU messages while it is still in the learning state 404. This also causes a transition to the loop inconsistent state 408.

Event E2 corresponds to the receipt of a BPDU message while in the loop inconsistent state 408. As indicated above, the receipt of a BPDU message causes the port to transition out of the loop inconsistent state 408. The port typically transitions to the discarding state 402, and subsequently, the STP engine 208 determines the proper port role and state, depending on the information contained in the received BPDU message.

Event E3 corresponds to a designated port or the root port in the blocking state 402 transitioning to the learning state 404 due to the expiration of the forward delay time. Event E4 corresponds to the expiration of the forward delay time without receipt of a BPDU message containing "better" information, while event E5 corresponds to the receipt of "better" BPDU information by a port in the learning state 404 or in the forwarding state 406. Event E6 corresponds to a port in the blocking state 402 becoming a designated port or the root port, and being able to transition directly to the forwarding state 406 as provided by the 802.1w or 802.1s specification standards.

It should be understood that the port transition state machine 214 may employ other spanning tree port states, such as the disabled state, the listening state (which is described in the 802.1D specification standard), and the forgetting state as described in U.S. Pat. No. 5,790,808, titled Active Topology Maintenance in Reconfiguring Bridged Local Area Networks with State Transition with Forgetting Interval to Michael Seaman, which is also hereby incorporated by reference in its entirety, among other spanning tree port states.

As shown, loop guard is preferably enabled or disabled on a port-by-port basis. More specifically, the loop guard engine 218 may have access to configuration information stored for switch 112. This configuration information, moreover, preferably specifies which ports are and are not enabled for loop guard. A network administrator working either locally or remotely from switch 112 preferably sets or loads the configuration information. It should be understood that the loop guard mechanism of the present invention may be implemented in such a way that it is implicitly effective on all point-to-point duplex links on any given bridge. Also, determination of a point-to-point link may depend on the configuration items as described in the RSTP specification standard.

In the preferred embodiment, loop guard is designed for use only on ports that are and/or are likely to be assigned the Alternate Port Role or the Root Port Role for all possible combinations of active topologies. In deciding whether or not to enable loop guard on a given port, the network administrator preferably takes into account all possible fail over scenarios. Ports that are and/or are likely to be assigned to either the Designated Port Role or the Backup Port Role preferably have loop guard disabled. In other words, loop guard is not enabled on ports coupled to shared media, such as ports P2, P3 and P4 of switch 112 which are coupled to LANs 107, 106, and 105, respectively. By default, loop guard is preferably disabled. That is, loop guard is only enabled in response to explicit or overt action by the network administrator, such as the entering of a specific command during configuration of the switch.

Ports for which loop guard should be enabled include ports coupled to the uplinks of an access switch, the root port of a secondary root switch, and a designated port of a root switch that could become the root port if some other switch is elected the root, among others. An access switch is an intermediate network device to which end stations, e.g., workstations, servers, etc., are directly coupled and which is typically located at an edge of a computer network. The uplinks refer to the trunk links that couple the access switch to the network backbone.

In the preferred embodiment, when a port is transitioned to the loop inconsistent state, the loop guard engine 218 preferably logs a first message reflecting that occurrence. Similarly, when a port moves out of the loop inconsistent state, the loop guard engine 218 logs a second message reflecting that occurrence. These messages, which may be accessed and reviewed by a network administrator as a diagnostic check, are preferably stored in a log file at the switch 112, such as a syslog file. Alternatively or additionally, the messages may be sent to a network administration console via the well-known Simple Network Management Protocol (SNMP) or by some other method.

As indicated above, it should be understood that the present invention may be used with any spanning tree protocol or algorithm, which, in addition to those previously mentioned, includes the algorithm described at pp. 54–75 of R. Perlman *Interconnections: Bridges and Routers* (Addison-Wesley 1992), among others.

It should be further understood that rather than transitioning a port to the loop inconsistent state 408, the loop guard engine 218 could be configured to transition the port to or keep the port in the discarding state 402, as the case may be. Once the port is in the discarding state 402, the loop guard engine 218 keeps it there until a BPDU message is received. In other words, the loop guard engine 218 overrides the port role selection state machine 212 and the port transition state machine 214, which might otherwise try to transition the port to the learning and/or forwarding states 404, 406 when no BPDU messages are received.

Interoperation With Other Switching Functions.

The loop guard mechanism of the present invention may also be configured to operate with other features employed by the switch.

Multiple Spanning Tree Instances

Those skilled in the art understand that the bridged network 100 may be segregated into a series of logical network segments. U.S. Pat. No. 5,394,402, issued Feb. 28, 1995 (the "'402 patent"), for example, discloses an arrangement for associating any port of a switch with any particular segregated network group. Specifically, according to the '402 patent, any number of physical ports of a particular switch may be associated with any number of groups within the switch by using a virtual local area network (VLAN) arrangement that virtually associates the port with a particular VLAN designation. These VLAN designations are also associated with the messages that are received on these ports. In particular, every time a message is received on one of these ports, the VLAN designation for that port, as stored in a memory portion of the bridge, is associated with the message. For convenience, each VLAN designation is often associated with a different color, such as red, blue, green, etc.

In addition to the '402 patent, the IEEE has promulgated the 802.1Q specification standard for Virtual Bridged Local Area Networks. The IEEE's 802.1Q standard supports VLANs and defines a specific VLAN-tagged message format for transmission on trunks.

With the development of VLANs, several "solutions" have been developed for overlaying spanning trees on these virtually segregated network groups. The IEEE 802.1Q standards committee, for example, has proposed defining a single spanning tree for all VLAN designations in the computer network. Thus, either all VLAN tagged frames may be forwarded and received through a given port or none may be. An alternative to the 802.1Q single spanning tree approach is to define a separate spanning tree for each VLAN designation within the network. This alternative is currently being implemented by certain networking equipment from Cisco Systems, Inc., as described in the Cisco IOS VLAN Services document. With this approach, BPDUs are preferably tagged with each of the VLAN designations defined within the bridged network. Upon receipt, these tagged BPDUs are then processed by the switches so as to define a separate spanning tree or active topology for each VLAN designation within the bridged network. Thus, for a given port, messages associated with one VLAN designation, e.g., blue, may be forwarded and received while messages associated with a second VLAN designation, e.g., green, may be blocked.

Suppose switch 112 (FIG. 1) is employing the multiple spanning tree solution and that it stops receiving BPDU messages associated with one particular VLAN, e.g., "red", on port P1, but that it continues to receive BPDU messages associated with other VLANs, e.g., blue and green, on the port. In this case, the loop guard engine 218 preferably causes the port transition state machine 214 to transition the port P0's spanning tree port state to the loop inconsistent state 408 but only for the red VLAN. That is, the loop guard engine 218 preferably allows the spanning tree port states associated with the blue and green VLANs to remain as they are, as BPDU messages for these VLANs continue to be received on port P0. Accordingly, network messages tagged with the "red" VLAN designation are blocked from port P0, while network messages tagged with either the blue or the green VLAN designations may continue to be forwarded and received.

Rather than providing a separate active topology for each VLAN designation within the bridged network 100, it is also possible to define more than one active topology but some number less than the total number of VLAN designations. In addition to the MST protocol mentioned above, U.S. Pat. No. 6,188,694, titled Shared Spanning Tree Protocol to Michael Fine et al., for example, describes a system in which a plurality of spanning trees are defined and shared by a number of VLAN designations. If switch 112 employed a shared spanning tree protocol and stopped receiving BPDU messages for a particular active topology, then it would preferably transition the spanning tree port state associated with the particular active topology to the loop inconsistent state 408. Network messages associated with each of the VLAN designations assigned to the particular spanning tree would be blocked from the affected port, while network messages associated with VLAN designations assigned to other spanning trees could continue to be forwarded and received.

Port Aggregation Protocol (PAgP)

Multiple physical ports, e.g., ports 202, may also be logically aggregated into a virtual port or a channel. U.S. Pat. No. 5,959,968, titled Port Aggregation Protocol to Hon Wah Chin et al., for example, describes a system for aggregating a plurality of physical ports into a single, logical aggregation port. Alternatively, a network administrator can manually group two or more physical ports into a corresponding channel. Typically, the spanning tree protocol runs "above" the port aggregation protocol. That is, physical ports are aggregated and then the spanning tree protocol only considers the logical aggregation ports or channels, and not the underlying physical ports, in computing the active topology. If BPDU messages stop being receiving on a logical aggregation port or channel, the loop guard engine 218 preferably causes that logical aggregation port or channel to be transitioned to the loop inconsistent state 408. In other words, network messages are blocked from being forwarded on or received from each of the underlying physical ports that comprise the affected logical aggregation port or channel.

Unidirectional Link Detection Protocol (UDLD)

The Unidirectional Link Detection Protocol (UDLD) from Cisco Systems, Inc. is a layer 2 (L2) protocol for determining the physical status of a link. In particular, UDLD detects the identities of neighbors and shuts down misconnected ports. Together with autonegotiation, which operates at layer 1 (L1), UDLD can prevent physical and logical unidirectional connections.

The loop guard mechanism of the present invention can work in a complementary fashion with UDLD. That is, both may be implemented on a given port. Depending on the configuration or setting of various STP timers, such as forward delay, UDLD or loop guard will be the first to detect a unidirectional failure.

Uplink/Backbone Fast

Those skilled in the art will recognize that other mechanisms exist besides RSTP to transition ports from the blocking spanning tree port state directly and rapidly to the forwarding state. U.S. Pat. No. 6,032,194, titled Method and Apparatus for Rapidly Reconfiguring Computer Networks to Silvano Gai, et al. describes such a method. U.S. Pat. No. 6,202,114, titled Spanning Tree with Fast Link-Failure Detection to Dinesh Dutt et al. describes another such method. Many of these other mechanisms transition the affected port before the corresponding maximum age timer expires. As the loop guard mechanism of the present invention preferably waits until the maximum age timer expires before transitioning a port to the loop inconsistent state 408, these other mechanisms will operate transparently to loop guard. In other words, the port will transition to forwarding before loop guard is triggered.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate network device having a plurality of ports for forwarding network messages within a bridged network, a method for preventing the formation of loops within the bridged network, the method comprising the steps of:
   executing a spanning tree protocol (STP) at the intermediate network device so as to elect a root of the bridged network and to transition at least one of the device's ports among a plurality of spanning tree port states, including a discarding state, a listening state and a forwarding state;
   periodically receiving configuration bridge protocol data unit (BPDU) messages at one or more of the device's ports;
   in response to the periodic receipt of BPDU messages being stopped on a given port, (1) preventing the given port from transitioning to the forwarding spanning tree port state, if the given port is in a spanning tree port state other than the forwarding spanning tree port state, or (2) precluding the given port from forwarding or receiving network messages, if the given port is in the forwarding spanning tree port state.

2. The method of claim 1 wherein the spanning tree port states further include a loop inconsistent spanning tree port state, and the method further comprises the step of placing the given port that stopped receiving BPDU messages in the loop inconsistent spanning tree port state.

3. The method of claim 2 wherein a port in the loop inconsistent state is precluded from transitioning to another spanning tree port state and from forwarding or receiving network messages.

4. The method of claim 2 further comprising the steps of:
   releasing the given port from the loop inconsistent spanning tree port state, in response to a BPDU message once again being received on the given port; and
   transitioning the given port from the loop inconsistent spanning tree port state to another spanning tree port state.

5. The method of claim 4 further comprising the steps of:
   storing BPDU information from BPDU messages periodically received on a first port;
   resetting a message age timer upon receipt of each BPDU message at the first port; and
   if the message age timer reaches a maximum age value before another BPDU message is received on the first port, discarding the stored BPDU information.

6. The method of claim 5 wherein the given port is considered to have stopped receiving BPDU messages when its message age timer reaches the maximum age value and/or its received information while timer reaches zero.

7. The method of claim 6 wherein the ability to place ports in the loop inconsistent state is enabled and disabled on a port-by-port basis.

8. The method of claim 6 further comprising the steps of assigning or more ports to a role, the roles including one or more of a Root Port Role, an Alternate Port Role, a Designated Port Role and a Backup Port Role.

9. The method of claim 5 wherein the STP substantially complies with at least one of the IEEE 802.1D, 802.1w and 802.1s specification standards.

10. An intermediate network device configured to receive and forward network messages within a bridged network, the device having a plurality of ports for connecting the device to one or more network entities or other devices, the intermediate network device comprising:
    a spanning tree protocol (STP) engine configured and arranged to elect a root of the bridged network and to transition at least some of the device's ports among a plurality of spanning tree port states, including a discarding or blocking state, a listening state and a forwarding state; and
    a loop guard engine cooperating with the STP engine, wherein
    configuration bridge protocol data unit (BPDU) messages are periodically received at one or more of the device's ports, and
    in response to the periodic receipt of BPDU messages being stopped on a given port, the loop guard engine (1) prevents the given port from transitioning to the forwarding spanning tree port state, if the given port is in a spanning tree port state other than the forwarding spanning tree port state, or (2) precludes the given port from forwarding or receiving network messages.

11. The intermediate network device of claim 10 wherein the spanning tree port states further include a loop inconsistent spanning tree port state, and the loop guard engine causes the given port that stopped receiving BPDU messages to be transitioned to the loop inconsistent spanning tree port state.

12. The intermediate network device of claim 11 wherein
    the spanning tree port states further include a loop inconsistent spanning tree port state, and
    the loop guard engine causes the given port that stopped receiving BPDU messages to be transitioned to the loop inconsistent spanning tree port state.

13. The intermediate network device of claim 12 wherein
    the loop guard engine causes the given port to be released from the loop inconsistent spanning tree port state, in response to a BPDU message once again being received on the given port, and
    upon being released from the loop inconsistent spanning tree port state, the STP engine transitions the given port to another spanning tree port state.

14. The intermediate network device of claim 13 further comprising a message age time associated with a first port, wherein
    the STP engine stores BPDU information from BPDU messages periodically received on the first port,
    restarts the message age timer upon receipt of each BPDU message at the first port,
    if the message age timer reaches a maximum age value before another BPDU message is received on the first port, the STP engine discards the stored BPDU information, and
    the first port is considered to have stopped receiving BPDU messages and is transitioned to the loop inconsistent state when its message age timer reaches the maximum age value.

15. The intermediate network device of claim 10 wherein the given port is kept in a blocking state to preclude the given port from forwarding or receiving network messages.

* * * * *